(12) United States Patent
Lee

(10) Patent No.: US 11,614,829 B2
(45) Date of Patent: Mar. 28, 2023

(54) DISPLAY DEVICE AND DRIVING METHOD THEREOF

(71) Applicant: Samsung Display Co., Ltd., Yongin-si (KR)

(72) Inventor: Soon Gyu Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/443,408

(22) Filed: Jul. 26, 2021

(65) Prior Publication Data

US 2022/0179540 A1    Jun. 9, 2022

(30) Foreign Application Priority Data

Dec. 4, 2020    (KR) .................. 10-2020-0168985

(51) Int. Cl.
*G06F 3/041*    (2006.01)
*G06F 3/044*    (2006.01)
*G06V 40/13*    (2022.01)

(52) U.S. Cl.
CPC ........ *G06F 3/04166* (2019.05); *G06F 3/0443* (2019.05); *G06V 40/1306* (2022.01); *G06V 40/1318* (2022.01)

(58) Field of Classification Search
None
See application file for complete search history.

(56) References Cited

U.S. PATENT DOCUMENTS

| 8,982,097 | B1 | 3/2015 | Kuzo et al. |
| 9,904,409 | B2 | 2/2018 | Lee et al. |
| 10,684,731 | B2 | 6/2020 | Wang et al. |
| 2017/0344787 | A1* | 11/2017 | Cho ................... G06F 3/04886 |
| 2022/0012449 | A1* | 1/2022 | Seong ............... G06V 40/1388 |

FOREIGN PATENT DOCUMENTS

| KR | 10-2016-0123200 A | 10/2016 |
| KR | 10-2020-0032227 A | 3/2020 |
| WO | WO 2019/032587 A1 | 2/2019 |

* cited by examiner

*Primary Examiner* — Nicholas J Lee
(74) *Attorney, Agent, or Firm* — Lewis Roca Rothgerber Christie LLP

(57) ABSTRACT

A display device according to some embodiments includes a display panel including a sensing area, touch electrodes in the sensing area, a fingerprint sensor overlapping at least a portion of the touch electrodes, and a sensor driver configured to drive the touch electrodes and the fingerprint sensor, wherein the sensor driver drives the touch electrodes in a first sensing mode or a second sensing mode depending on whether a foreign substance exists in a touch inputted to the sensing area, and drives the fingerprint sensor in a fingerprint sensing mode or a touch sensing mode.

20 Claims, 8 Drawing Sheets

DISPLAY DEVICE AND DRIVING METHOD THEREOF

CROSS-REFERENCE TO RELATED APPLICATION

The application claims priority to, and the benefit of, Korean Patent Application No. 10-2020-0168985, filed Dec. 4, 2020, in the Korean Intellectual Property Office, which is hereby incorporated by reference for all purposes as if fully set forth herein.

BACKGROUND

1. Field

The present disclosure relates to a display device and a driving method thereof.

2. Description of Related Art

With increasing interest in information display, and with increasing demand for use of portable information media, demand for a display device for displaying an image and commercialization are being made intensively.

The display device may provide a touch-based input method that enables a user to intuitively and conveniently input information or commands in addition to conventional input methods, such as buttons, keyboards, and mice. In addition, recently, a method of utilizing a fingerprint, which is one of biometric information, as a user authentication means for online banking, product purchase, security, etc. has been proposed, and a demand for a display device having a fingerprint recognition function is increasing.

SUMMARY

An aspect of the present disclosure provides a display device capable of improving touch performance and a driving method thereof.

A display device according to some embodiments of the present disclosure may include a display panel including a sensing area, touch electrodes in the sensing area, a fingerprint sensor overlapping at least a portion of the touch electrodes, and a sensor driver configured to drive the touch electrodes and the fingerprint sensor, to drive the touch electrodes in a first sensing mode or a second sensing mode depending on whether a foreign substance exists in a touch inputted to the sensing area, and to drive the fingerprint sensor in a fingerprint sensing mode or a touch sensing mode.

When the foreign substance exists in the touch, the sensor driver may be configured to drive the touch electrodes in the second sensing mode, and to drive the fingerprint sensor in the touch sensing mode.

When the foreign substance does not exist in the touch, the sensor driver may be configured to drive the touch electrodes in the first sensing mode, and to drive the fingerprint sensor in the fingerprint sensing mode.

The first sensing mode may include a mutual capacitance method, wherein the second sensing mode includes a self-capacitance method.

The first sensing mode may include a mutual capacitance method and a self-capacitance method, wherein the touch electrodes are alternately driven in the mutual capacitance method and the self-capacitance method in the first sensing mode.

The first sensing mode may include a self-capacitance method, wherein the touch electrodes are driven in the self-capacitance method in the first sensing mode.

The fingerprint sensor may be driven to sense a user's fingerprint in the fingerprint sensing mode, wherein the fingerprint sensor is driven to sense a user's touch input in the touch sensing mode.

The fingerprint sensor may include sensing electrodes, an optical sensor, or an ultrasonic sensor.

The fingerprint sensor may include the sensing electrodes, and may be driven in a self-capacitance method in the touch sensing mode.

The fingerprint sensor may include the optical sensor, and may be driven so that a time for capturing a sensor image in the touch sensing mode is shorter than a reference time.

The fingerprint sensor may include the ultrasonic sensor, and may be driven so that image processing is processed faster than a reference time in the touch sensing mode.

A driving method of a display device according to some embodiments of the present disclosure may include driving touch electrodes in a first sensing mode, receiving an inputted first touch at a sensing area, determining whether a foreign substance exists in the inputted first touch, and driving the touch electrodes in a second sensing mode that is different from the first sensing mode, and driving a fingerprint sensor in a touch sensing mode to sense a user's touch input, when the foreign substance exists.

The method may further include driving the touch electrodes in the first sensing mode when the foreign substance does not exist.

The method may further include driving the fingerprint sensor in a fingerprint sensing mode to sense a user's fingerprint when the foreign substance does not exist.

The first sensing mode may include a mutual capacitance method, wherein the second sensing mode includes a self-capacitance method.

The first sensing mode may include a mutual capacitance method and a self-capacitance method, the method further including alternately driving the touch electrodes in the mutual capacitance method and the self-capacitance method in the first sensing mode.

The sensing area may include a first sensing area in which the touch electrodes are located, and a second sensing area in which the fingerprint sensor is located, the method further including driving the touch electrodes in the second sensing mode when the inputted first touch is inputted to the first sensing area.

The method may further include driving the fingerprint sensor in the touch sensing mode when the inputted first touch is inputted to the second sensing area.

The method may further include driving the touch electrodes in the second sensing mode and driving the fingerprint sensor in the touch sensing mode to obtain first position information of the inputted first touch, receiving an inputted second touch at the sensing area, determining whether the foreign substance exists in the inputted second touch, driving the touch electrodes in the second sensing mode, and driving the fingerprint sensor in the touch sensing mode, when the foreign substance exists, and driving the touch electrodes in the second sensing mode and driving the fingerprint sensor in the touch sensing mode to obtain second position information of the inputted second touch.

The method may further include driving the touch electrodes in the first sensing mode when the foreign substance does not exist, and driving the fingerprint sensor in the fingerprint sensing mode.

BRIEF DESCRIPTION OF THE DRAWINGS

The accompanying drawings, which are included to provide a further understanding of the disclosure, and are incorporated in and constitute a part of this specification, illustrate embodiments of the disclosure, and, together with the description, serve to explain aspects of the disclosure.

DETAILED DESCRIPTION

Figure 1:
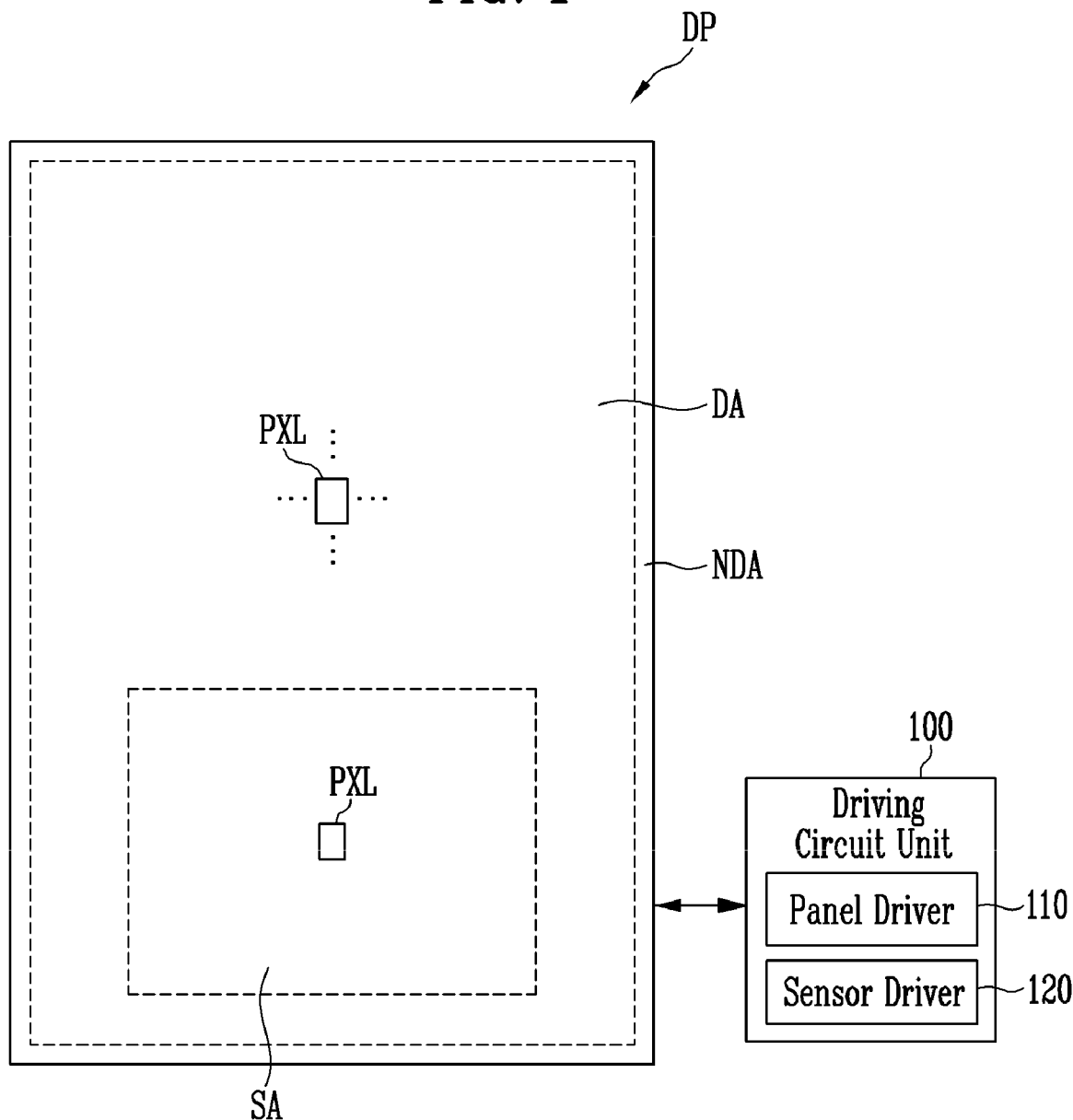
FIGS. 1 and 2 are plan views schematically illustrating a display device according to some embodiments.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects of the present disclosure to those skilled in the art. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts not related to the description of the embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing.

Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, in this specification, the phrase "on a plane," or "plan view," means viewing a target portion from the top, and the phrase "on a cross-section" means viewing a cross-section formed by vertically cutting a target portion from the side.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

As used herein, the term "and/or" includes any and all combinations of one or more of the associated listed items. For example, the expression such as "A and/or B" may include A, B, or A and B.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
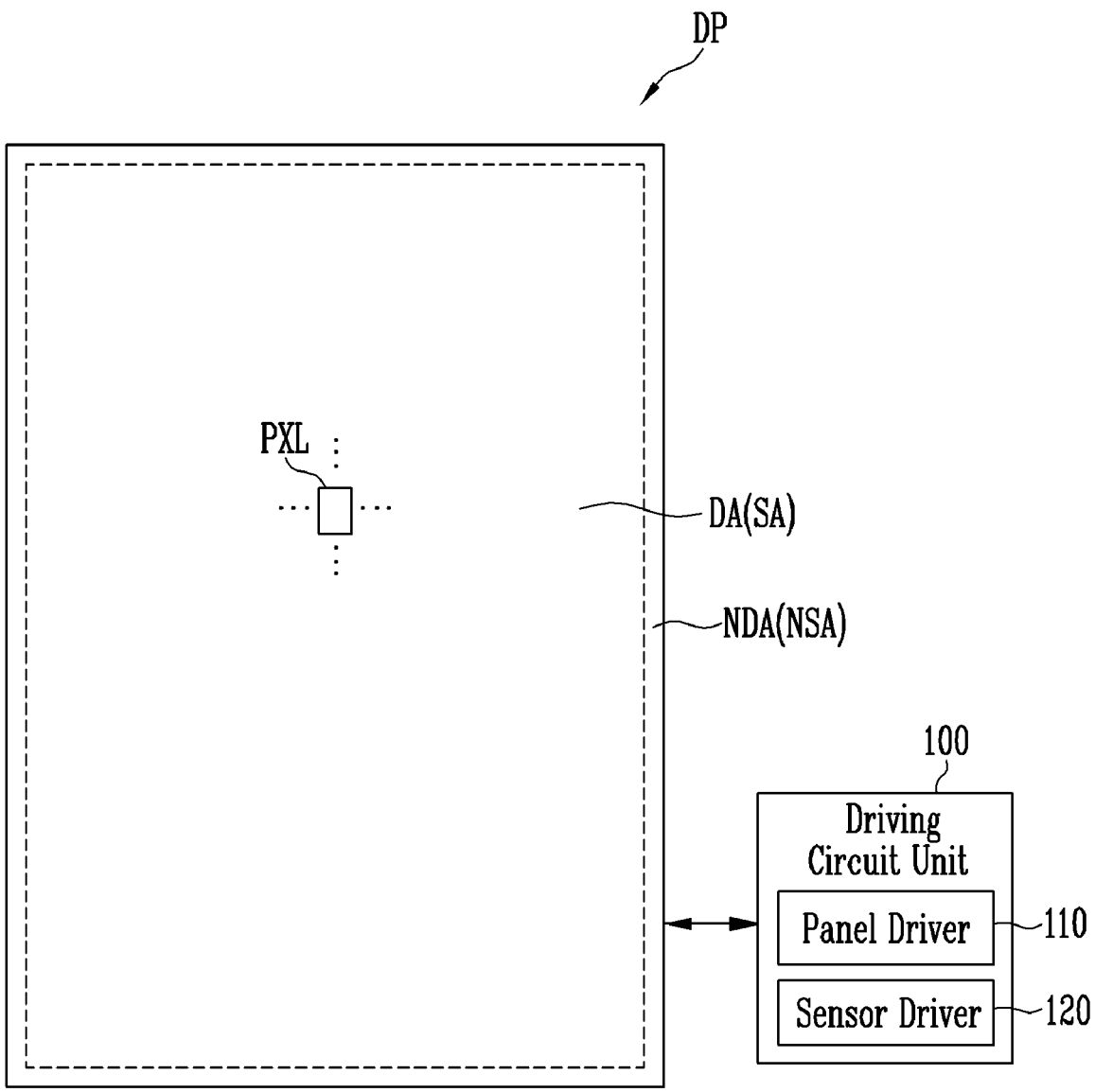

FIGS. 1 and 2 are plan views schematically illustrating a display device according to some embodiments.

Referring to FIGS. 1 and 2, a display device according to some embodiments may include a display panel DP and a driving circuit unit 100 for driving the display panel DP.

The display panel DP may include a display area DA and a non-display area NDA.

The display area DA may be an area in which a plurality of pixels PXL is provided, and in which an image is displayed. Each of the pixels PXL may include at least one light emitting element. According to some embodiments, the light emitting element may be an organic light emitting diode, or an ultra-small inorganic light emitting diode having a size ranging from micro-scale to nano-scale. The display panel DP may display the image on the display area DA by driving the pixels PXL in response to image data inputted from outside.

The non-display area NDA may be positioned to surround the display area DA, and may be an area in which the image is not displayed. According to some embodiments, the non-display area NDA may be positioned on one side of the display area DA. Further, according to some embodiments, driving lines, signal lines, pads, and/or various dummy patterns may be located in the non-display area NDA.

In some embodiments, a partial area of the display panel DP may be set as a sensing area SA capable of sensing a user's touch input, a user's fingerprint, or the like.

As shown in FIG. 1, a part of the display area DA may include the sensing area SA. The sensing area SA may include some of the pixels PXL provided in the display area DA. An area of the display panel DP excluding the sensing area SA may be referred to as a non-sensing area NSA.

FIG. 1 shows an example in which one sensing area SA is set in the display area DA, but the present disclosure is not limited thereto. According to some embodiments, a plurality of sensing areas SA arranged regularly or irregularly may be set in the display area DA. In some embodiments, the plurality of sensing areas SA may have the same or different areas and/or shapes.

In addition, in some embodiments, most of the area of the display panel DP may be set as the sensing area SA capable of sensing the user's touch input, the user's fingerprint, or the like.

As shown in FIG. 2, the entire display area DA may be the sensing area SA. Accordingly, the non-display area NDA of the display panel DP excluding, or separate from, the sensing area SA may be the non-sensing area NSA.

Touch electrodes, a fingerprint sensor, and the like, which will be described later, may be positioned in the sensing area SA. The touch electrodes and the fingerprint sensor will be described in detail with reference to FIGS. 4 to 7.

The driving circuit unit 100 may include a panel driver 110 and a sensor driver 120.

The panel driver 110 may output a data signal corresponding to externally supplied image data that is inputted to the display panel DP. For example, the panel driver 110 may supply data signals to data lines connected to the pixels PXL in the display area DA, respectively. Accordingly, the display area DA may display the image corresponding to the image data.

The sensor driver 120 may output a driving signal for driving the touch electrodes, the fingerprint sensor, and the like, and may receive a sensing signal from the touch electrodes, the fingerprint sensor, and the like. Accordingly, the sensor driver 120 may sense the user's touch input from the touch electrodes, and may detect the user's fingerprint (or fingerprint type) from the fingerprint sensor.

In addition, in some embodiments, even when a foreign substance exists in the user's touch input, the sensor driver 120 may precisely sense a touch input by using the touch electrodes and the fingerprint sensor together. That is, the sensor driver 120 may determine a state of the user's touch input, and may determine a sensing mode of the touch electrodes and/or the fingerprint sensor. In addition, the sensor driver 120 may track the movement of a user's hand (or finger) using the sensing signal received from the touch electrodes and/or the fingerprint sensor.

For convenience of description, the display panel DP and the driving circuit unit 100 are separately shown in FIGS. 1 and 2, but the present disclosure is not limited thereto. According to some embodiments, all or part of the driving circuit unit 100 may be integrally implemented on the display panel DP.

Hereinafter, a stacking sequence of a display device will be briefly described with reference to FIG. 3.

Figure 3:
FIG. 3 is a schematic cross-sectional view of a display device according to some embodiments.
Figure 4:
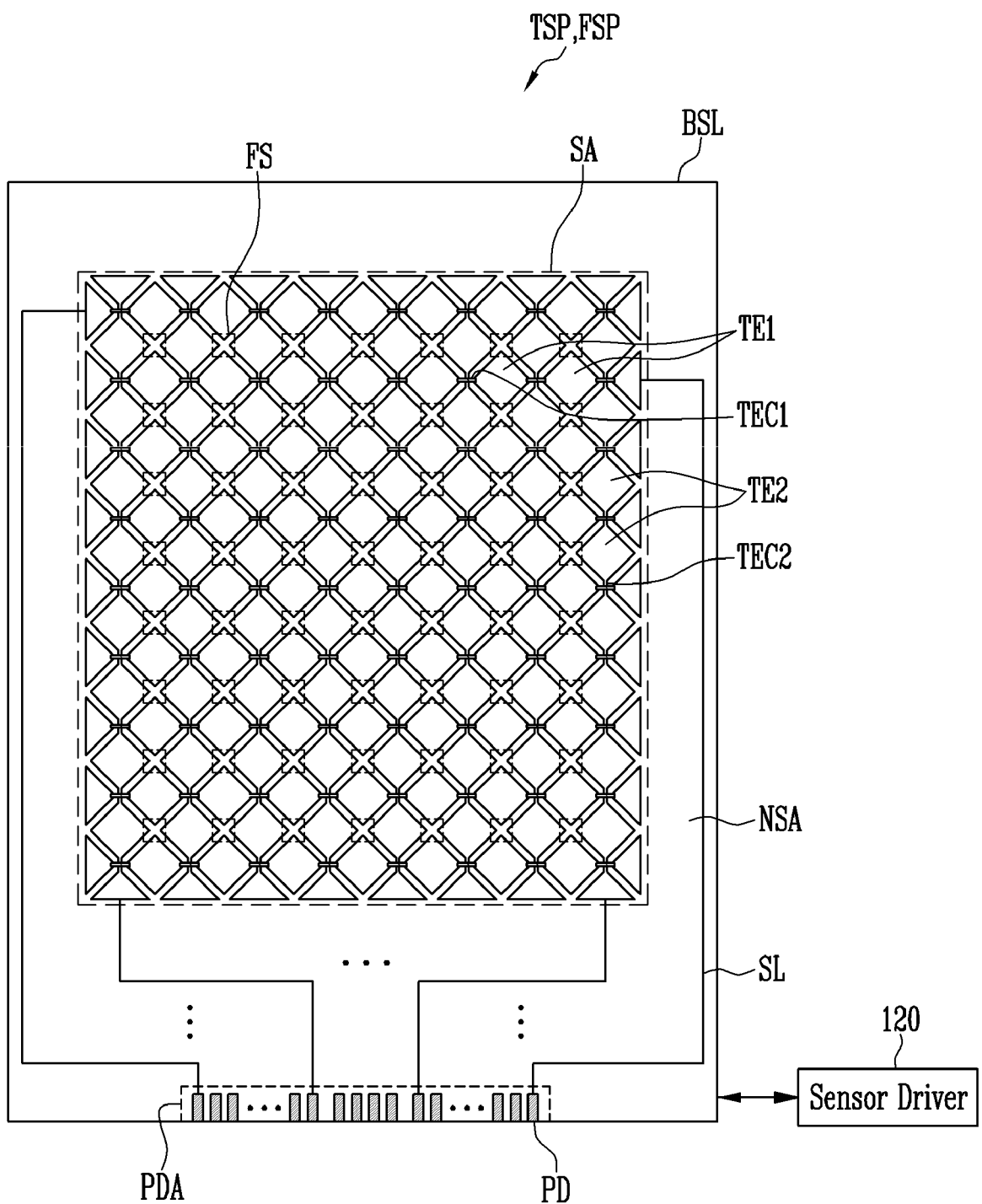
FIG. 4 is a plan view schematically illustrating a touch panel and a fingerprint sensor layer of the display device according to some embodiments.

FIG. 3 is a schematic cross-sectional view of a display device according to some embodiments, and FIG. 4 is a plan view schematically illustrating a touch panel and a fingerprint sensor layer of the display device according to some embodiments.

First, referring to FIG. 3, a display device according to some embodiments may include a base layer BSL, a display panel DP, a touch panel TSP, a fingerprint sensor layer FSP, and a window WD.

The base layer BSL may include a transparent insulating material, and may transmit light. The base layer BSL may be a rigid substrate including glass, quartz, or tempered glass, or a flexible substrate made of, for example, plastic. The material of the base layer BSL is not limited thereto, and may be made of various materials.

The display panel DP may be positioned on the base layer BSL. The display panel DP may include a circuit element layer, a display element layer, and an encapsulation layer. The circuit element layer may include a pixel circuit composed of a driving signal line, a transistor, a capacitor, and the like to drive a display element. The display element layer may be positioned on the circuit element layer, and may include a light emitting element. The light emitting element of the display element layer may be electrically connected to a circuit element of the circuit element layer, and may be driven according to a voltage applied from the circuit element. The encapsulation layer may be positioned on the display element layer, and may be located to seal the display element. The encapsulation layer may include at least one organic layer and at least one inorganic layer. The encapsulation layer may be a base layer of the touch panel TSP to be described later. In some embodiments, the base layer BSL and the display panel DP are shown as separate layers. However, according to some embodiments, the base layer BSL may be included in the display panel DP, and may be a base member of the display panel DP.

The touch panel TSP may sense a contact or input by an external medium, such as a user's hand (or finger) or a pen, to the surface of the display device. In some embodiments, the touch panel TSP and the display panel DP are shown as separate layers. However, according to some embodiments, the touch panel TSP may be positioned on the front surface of the display panel DP, and may be configured as a part of the display panel DP. The structure of the touch panel TSP will be described later in detail with reference to FIG. 4.

The fingerprint sensor layer FSP may include the fingerprint sensor, and may be positioned on the same layer as the touch panel TSP. In some embodiments, the fingerprint sensor may include a plurality of sensing electrodes, and the plurality of sensing electrodes may be driven in a capacitance method. For example, the fingerprint sensor implemented with the sensing electrodes may be driven in a self-capacitance method. These sensing electrodes may be connected to the pads of the display panel DP through wirings.

According to some embodiments, the fingerprint sensor layer FSP may be positioned under the base layer BSL. In this case, the fingerprint sensor may be an optical sensor to be optically driven, or an ultrasonic sensor to be ultrasonically driven.

For example, when the fingerprint sensor is implemented as the optical sensor, the sensor driver 120 may supply the driving signal for sensing a fingerprint to the pixels PXL. Accordingly, the pixels PXL may emit light to operate as a light source for driving the fingerprint sensor. The driving signal for sensing the fingerprint may be provided to the pixels PXL positioned in the sensing area SA of the display area DA. In addition, the sensor driver 120 may provide the driving signal for driving optical sensors, and may detect the user's fingerprint based on sensing signals provided from the optical sensors.

For example, when the fingerprint sensor is implemented as the ultrasonic sensor, the ultrasonic sensor located on one surface of the display panel DP may emit ultrasonic waves to scan the user's fingerprint positioned on the other surface of the display panel DP, and may detect the user's fingerprint based on the scanned image.

Among fingerprint sensors that may be positioned under the base layer BSL, the fingerprint sensor implemented as the optical sensor will be described later with reference to FIGS. 5 to 7.

The window WD may be positioned on the touch panel TSP. The window WD may be a transparent substrate through which light may be transmitted as a protective member for protecting the display device from external impact. The window WD may include a glass substrate, a base film including a synthetic resin film and the like, a light shielding pattern, a functional coating layer, and the like. Here, the base film may be composed of a single layer or a plurality of layers. According to some embodiments, an adhesive layer may be positioned between the touch panel TSP and the window WD, and the adhesive layer may include an optically transparent adhesive member.

Referring to FIG. 4, the touch panel TSP may include the sensing area SA in which touch electrodes TE1 and TE2 are located, and the non-sensing area NSA surrounding the sensing area SA. The sensing area SA of FIG. 4 may be an area that may include the display area DA of FIG. 2, or may further include a part of the non-display area NDA. The non-sensing area NSA may be an area excluding the sensing area SA from the non-display area NDA of FIG. 2.

The touch electrodes TE1 and TE2 may be located in the sensing area SA. In some embodiments, the sensing area SA in which the touch electrodes TE1 and TE2 are located may be referred to as a first sensing area.

The touch electrodes TE1 and TE2 may include a plurality of first touch electrodes TE1 and a plurality of second touch electrodes TE2. The first touch electrode TE1 and the second touch electrode TE2 may be separated from each other. According to some embodiments, the first touch electrode TE1 may be a touch input Tx electrode, and the second touch electrode TE2 may be a touch output Rx electrode. In addition, the first touch electrode TE1 may be the touch output Rx electrode, and the second touch electrode TE2 may be the touch input Tx electrode.

The plurality of first touch electrodes TE1 and the plurality of second touch electrodes TE2 may be alternately dispersed so as not to overlap each other in the sensing area SA, and thus may be located in a mesh shape. The plurality of first touch electrodes TE1 may be located in a plurality along a column direction and a row direction, and the plurality of second touch electrodes TE2 may be located in a plurality along the column direction and the row direction.

The plurality of first touch electrodes TE1 and the plurality of second touch electrodes TE2 may be located on the same layer in the sensing area SA, or may be located on different layers with an insulating layer interposed therebetween. The first touch electrode TE1 and the second touch electrode TE2 may have a rhombus shape, but the present disclosure is not limited thereto. The first touch electrode TE1 and the second touch electrode TE2 may have a polygonal shape, such as a square or hexagonal shape, a circular shape, or an elliptical shape, and may be implemented in various shapes, such as a shape having a protrusion, to improve sensitivity of a sensing sensor.

At least some of the plurality of first touch electrodes TE1 arranged in the same row or column may be connected to each other inside or outside the sensing area SA, or may be separated from each other. In addition, at least some of the plurality of second touch electrodes TE2 arranged in the same row or column may be connected to each other inside or outside the sensing area SA, or may be separated from each other.

For example, as shown in FIG. 4, the plurality of first touch electrodes TE1 located in the same row may be connected to each other in the sensing area SA through first touch electrode connecting members TEC1, and the plurality of second touch electrodes TE2 located in the same column may be connected to each other in the sensing area SA through second touch electrode connecting members TEC2.

A plurality of signal lines SL connected to the plurality of first touch electrodes TE1 and the plurality of second touch electrodes TE2 may be positioned in the non-sensing area NSA. Further, the signal lines SL may be connected to pads PD of a pad area PDA.

The touch electrodes TE1 and TE2 may be driven in the self-capacitance method or the mutual capacitance method according to the driving signal of the sensor driver 120.

For example, in the self-capacitance method, the sensor driver 120 may supply driving signals to the plurality of first touch electrodes TE1 and the plurality of second touch electrodes TE2 to charge the first touch electrodes TE1 and the second touch electrodes TE2 with self-capacitances. In addition, the sensor driver 120 may measure the amount of change in charge of the first touch electrodes TE1 and the second touch electrodes TE2 through the signal lines SL, and may determine whether a touch is input according to the amount of change in charge.

In the mutual capacitance method, the sensor driver 120 may supply the driving signal to the plurality of first touch electrodes TE1 to charge mutual capacitances formed between the first touch electrodes TE1 and the second touch electrodes TE2. In addition, the sensor driver 120 may measure the amount of change in charge of the second touch electrode TE2 through the signal line SL connected to the second touch electrode TE2, and may determine whether a touch is input according to the amount of change in charge of the second touch electrode TE2.

In the self-capacitance method, the same signal (or voltage) may be applied to the first touch electrode TE1 and the second touch electrode TE2 to determine whether a user's touch is input close to the touch panel TSP. Therefore, the self-capacitance method may have better touch sensitivity performance than the mutual capacitance method. That is, when the self-capacitance method is used, the touch electrodes TE1 and TE2 may improve the touch sensitivity performance even when there is applied a touch input in which a foreign substance or the like exists.

The touch electrodes TE1 and TE2 may be driven in a first sensing mode or a second sensing mode according to the touch input provided to the sensing area SA.

The first sensing mode may be a driving method of the touch electrodes TE1 and TE2 when a general touch input is applied, and may be generally driven in the mutual capacitance method. For example, in the first sensing mode, the touch electrodes TE1 and TE2 may be driven only in the mutual capacitance method, although the present disclosure is not limited thereto. The touch electrodes TE1 and TE2 may be alternately driven in the self-capacitance method and the mutual capacitance method in the first sensing mode. Further, according to some embodiments, the touch electrodes TE1 and TE2 may be driven only in the self-capacitance method in the first sensing mode.

The second sensing mode may be a driving method of the touch electrodes TE1 and TE2 when a touch input, of which there exists a foreign substance or the like corresponding thereto, is applied, and may be generally driven in the self-capacitance method. In addition, according to some embodiments, in the second sensing mode, the touch electrodes TE1 and TE2 may be driven together with the fingerprint sensor in a touch sensing mode to sense the user's touch input, thereby improving sensitivity of the touch electrodes.

The sensor driver 120 may determine the driving method of the touch electrodes TE1 and TE2 according to the touch inputted to the sensing area SA. That is, the sensor driver 120 may determine whether the foreign substance exists in, or corresponds to, the touch inputted to the sensing area SA, and may apply the driving signal to the touch electrodes TE1 and TE2 to drive in the first sensing mode or in the second sensing mode. Here, the expression "when a foreign substance exists in the touch" may mean a state in which the touch electrodes TE1 and TE2 do not accurately sense a change in capacitance according to the user's touch input due to the foreign substance, such as dust, sweat, oil, moisture, etc., being sensed together with an input corresponding to a user's finger inputted to the sensing area SA.

The sensor driver 120 may drive the touch electrodes TE1 and TE2 in the second sensing mode when it is determined that the foreign substance exists in the touch inputted to the sensing area SA. On the other hand, the sensor driver 120 may drive the touch electrodes TE1 and TE2 in the first sensing mode when it is determined that the foreign substance does not exist in the touch inputted to the sensing area SA.

The fingerprint sensor layer FSP may include a plurality of sensing electrodes FS, and the plurality of sensing electrodes FS may be located in the sensing area SA. In some embodiments, the sensing area SA in which the fingerprint sensor (for example, the plurality of sensing electrodes FS) is located may be referred to as a second sensing area.

The plurality of sensing electrodes FS may be spaced apart from each other in the row direction and the column direction, and may be located in parallel with each other. The plurality of sensing electrodes FS may be arranged in a matrix form.

The sensing electrodes FS may overlap the touch electrodes TE1 and TE2 in the sensing area SA, and may be located between the touch electrodes TE1 and TE2 to be spaced apart from each other from the touch electrodes TE1 and TE2. In addition, the sensing electrode FS may partially overlap the touch electrodes TE1 and TE2. That is, one sensing electrode FS may be located, or partially located, between two first touch electrodes and two second touch electrodes to at least partially overlap the first touch electrode TE1 and the second touch electrode TE2.

The sensing electrode FS is shown as a square in some embodiments. However, the present disclosure is not limited thereto, and the sensing electrode may have a polygonal shape, such as a rhombus, or may have a hexagonal shape, a circular shape, or an elliptical shape, and may be implemented in various shapes such as a shape having a protrusion to improve the sensitivity of the sensing sensor. In addition, the number and arrangement of the plurality of sensing electrodes FS may be variously modified according to some embodiments.

The plurality of sensing electrodes FS may be connected to the pads PD of the pad area PDA by the signal lines connected to each sensing electrode FS.

The fingerprint sensor may be driven in a fingerprint sensing mode or a touch sensing mode according to the driving signal of the sensor driver 120.

The fingerprint sensing mode may be a driving method in which the fingerprint sensor senses the user's fingerprint to detect a general fingerprint. In this case, the sensing electrodes FS may sense a change in capacitance, and may be driven in the self-capacitance method. The present disclosure is not limited thereto, and the fingerprint sensor may be driven in the mutual capacitance method.

The touch sensing mode may be a driving method in which the fingerprint sensor senses the change in capacitance of the sensing electrodes FS to detect the user's touch input when the touch input in which the foreign substance or the like exists is applied. In this case, the sensing electrodes FS may be driven in the self-capacitance method. The present disclosure is not limited thereto, and the fingerprint sensor may be driven in the mutual capacitance method. However, the fingerprint sensor may reduce the number of sampling times in the touch sensing mode when compared to the fingerprint sensing mode to reduce the time for sensing the user's touch. Therefore, the user's touch input can be quickly detected.

The sensor driver 120 may determine a driving method of the fingerprint sensor according to the touch inputted to the sensing area SA. That is, the sensor driver 120 may determine whether the foreign substance exists in the touch inputted to the sensing area SA, and may apply the driving signal to the fingerprint sensor to drive in the fingerprint sensing mode or the touch sensing mode.

The sensor driver 120 may drive the fingerprint sensor in the touch sensing mode when it is determined that the foreign substance exists in the touch inputted to the sensing area SA. On the other hand, the sensor driver 120 may drive the fingerprint sensor in the fingerprint sensing mode when it is determined that the foreign substance does not exist in the touch inputted to the sensing area SA.

In some embodiments, the fingerprint sensor may be driven in the touch sensing mode together with the touch electrodes TE1 and TE2 when the foreign substance exists in the touch inputted to the sensing area SA. In this case, the touch electrodes TE1 and TE2 may be driven in the second sensing mode. Accordingly, the sensitivity of the touch electrodes can be improved by sensing the user's touch input together with the touch electrodes TE1 and TE2 and the fingerprint sensor.

Hereinafter, the fingerprint sensor layer positioned under the display panel will be described with reference to FIGS. 5 to 7.

Figure 5:
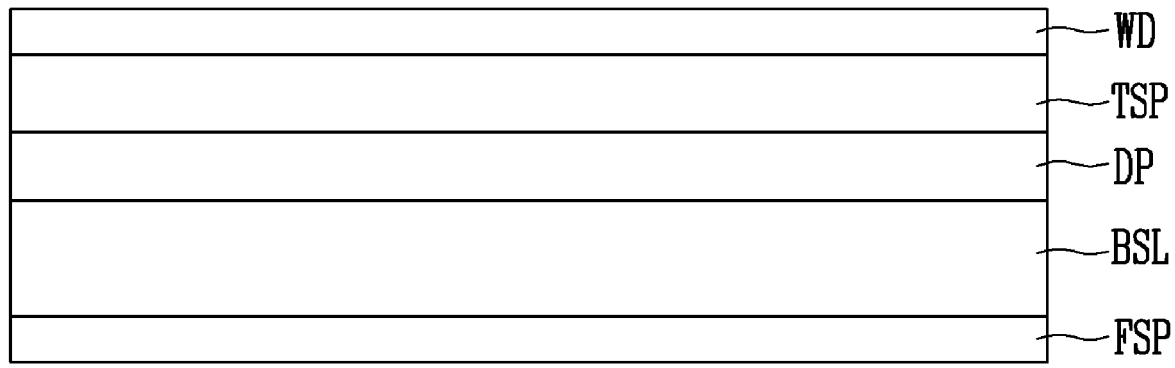
FIG. 5 is a schematic cross-sectional view of a display device according to some embodiments.
Figure 6:
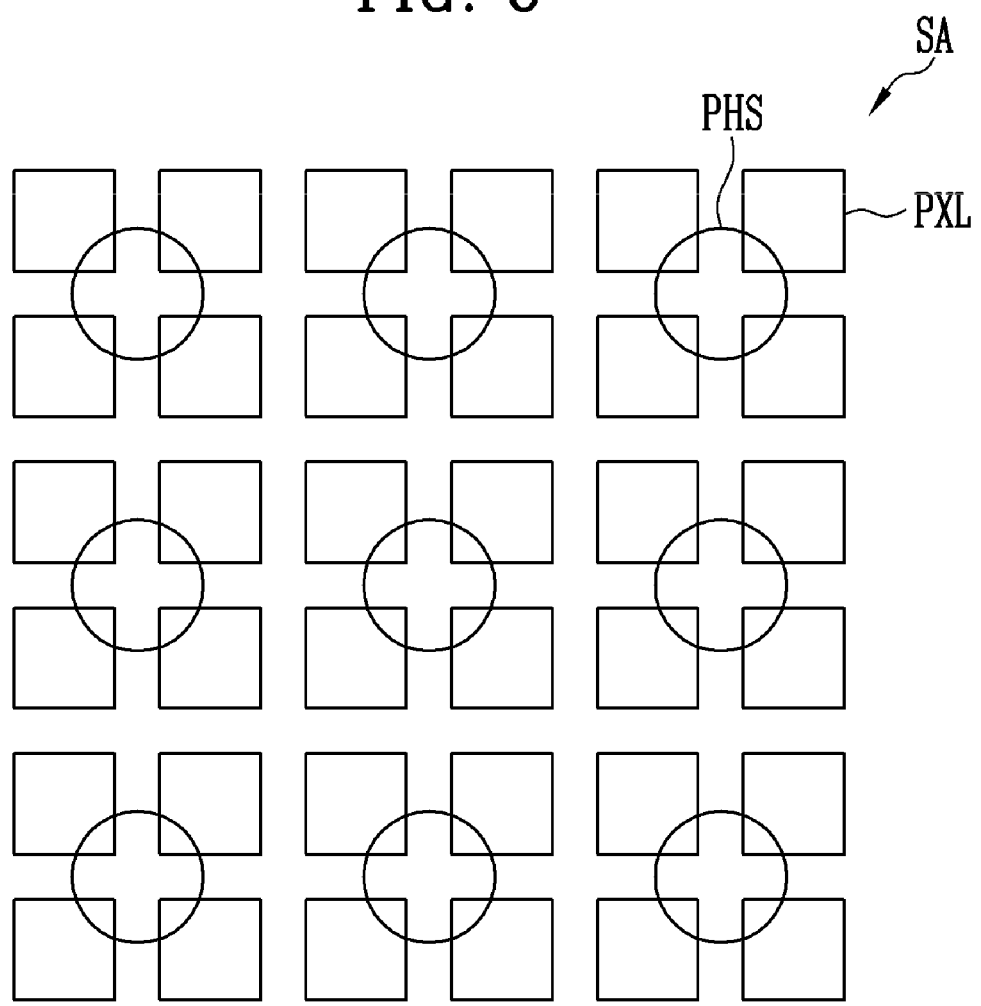
FIG. 6 is a plan view schematically illustrating a fingerprint sensor of the display device according to some embodiments.
Figure 7:
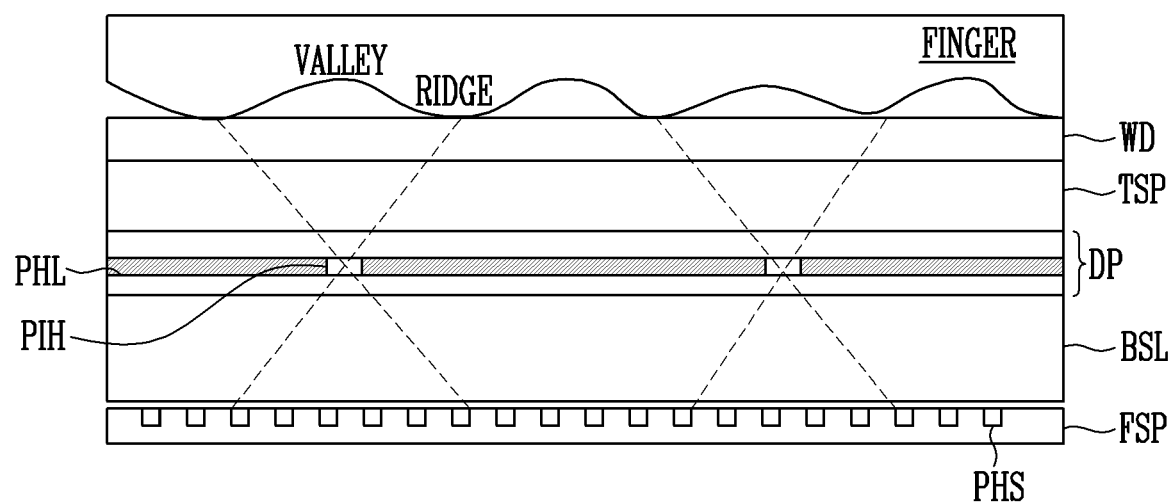
FIG. 7 is a schematic cross-sectional view of a display device according to some embodiments including the fingerprint sensor of FIG. 6.

FIG. 5 is a schematic cross-sectional view of a display device according to some embodiments, FIG. 6 is a plan view schematically illustrating a fingerprint sensor of the display device according to some embodiments, and FIG. 7 is a schematic cross-sectional view of a display device according to some embodiments including the fingerprint sensor of FIG. 6.

Referring to FIG. 5, a display device according to some embodiments may include a base layer BSL, a display panel DP, a touch panel TSP, a fingerprint sensor layer FSP, and a window WD.

Because the display device shown in FIG. 5 may be similar to the display device shown in FIG. 3, the differences will be described below.

The fingerprint sensor layer FSP may include a fingerprint sensor, and may be positioned under the base layer BSL. In some embodiments, the fingerprint sensor may be an optical sensor driven optically, or an ultrasonic sensor driven ultrasonically.

According to some embodiments, the fingerprint sensor of the fingerprint sensor layer FSP may be positioned only in a partial area of the lower surface of the base layer BSL, or may be positioned in a groove area of the base layer BSL formed by removing a partial area of the base layer BSL.

Referring to FIG. 6, the fingerprint sensor of the display device according to some embodiments may be implemented as the optical sensor. For example, optical sensors PHS may be located between the pixels PXL so as to overlap the pixels PXL in the sensing area SA. The optical sensors PHS may partially overlap the pixels PXL. There may be fewer optical sensors PHS than the pixels PXL in the sensing area SA. For example, one optical sensor PHS may be located for every four pixels PXL. However, the arrangement structure of the pixels PXL and the optical sensors PHS is not limited to the above-described embodiments. According to some embodiments, the pixels PXL and the optical sensors PHS might not overlap each other, or instead may be completely overlapped. The shape, arrangement, relative size, number, and/or resolution of the pixels PXL and the optical sensors PHS in the sensing area SA may be variously modified in other embodiments, and the present disclosure is not particularly limited. According to some embodiments, the optical sensor may be implemented to include an optical system serving as a light condenser, for example, a convex lens or the like.

Referring to FIG. 7, a display device according to some embodiments may include a base layer BSL, a display panel DP, a touch panel TSP, a fingerprint sensor layer FSP, and a window WD.

Because the display device shown in FIG. 7 may be similar to the display devices shown in FIGS. 3 and 5, the differences will be described below.

When a user's hand (or finger FINGER) is positioned on the surface of the window WD, the display device may sense the user's fingerprint or the user's touch input through the optical sensors PHS. While the user's hand is positioned on the surface of the window WD, when external light enters the display device, visible rays of the external light may be blocked by the user's hand, but infrared rays pass through the user's hand and enter the optical sensors PHS.

The display panel DP may include a light blocking layer PHL. In some embodiments, in more detail, the light blocking layer PHL may be located between the base layer BSL and the circuit element layer. The light blocking layer PHL may include a plurality of holes PIH. The light blocking layer PHL may block a part of light incident from the outside, for example, reflected light reflected from a finger, and may allow only a part of the remaining light to reach the lower layer through the holes PIH.

The fingerprint sensor layer FSP may be attached under the base layer BSL to overlap at least a portion of the display panel DP. The fingerprint sensor layer FSP may include a plurality of optical sensors PHS distributed at a corresponding resolution and/or interval (e.g., a predetermined resolution and/or interval). The interval between the optical sensors PHS may be set relatively densely so that reflected light that is reflected from an object to be sensed (for example, the user's finger) can be incident to at least two adjacent optical sensors PHS.

The optical sensors PHS of the fingerprint sensor layer FSP may receive the reflected light passing through the holes PIH, and may output an electrical signal corresponding to the reflected light as the sensing signal. The reflected light incident on the optical sensors PHS may have different characteristics (for example, frequency, wavelength, size, etc.) depending on whether it is caused by a valley VALLEY or a ridge RIDGE of a fingerprint formed on the user's finger FINGER. Accordingly, each of the optical sensors PHS may output the sensing signal having different electrical characteristics in response to optical characteristics of the reflected light. The sensing signals output by the optical sensors PHS may be converted into an original image (e.g., a sensor image, sensor data, or sensor image data) and may be used to identify the user's fingerprint.

In some embodiments, when the fingerprint sensor is implemented as the optical sensor and is driven in the touch sensing mode, the optical sensor can relatively quickly sense the user's touch input by reducing the time for capturing the sensor image to be shorter than an amount of time (e.g., a reference time, or a predetermined time).

In addition, in some embodiments, when the fingerprint sensor is implemented as the ultrasonic sensor and is driven in the touch sensing mode, the fingerprint sensor can quickly sense the user's touch input by reducing the time for processing the sensor image to be shorter than an amount of time (e.g., a reference time, or a predetermined time).

Hereinafter, a driving method of a display device according to some embodiments will be described with reference to FIGS. 8 to 11.

Figure 8:
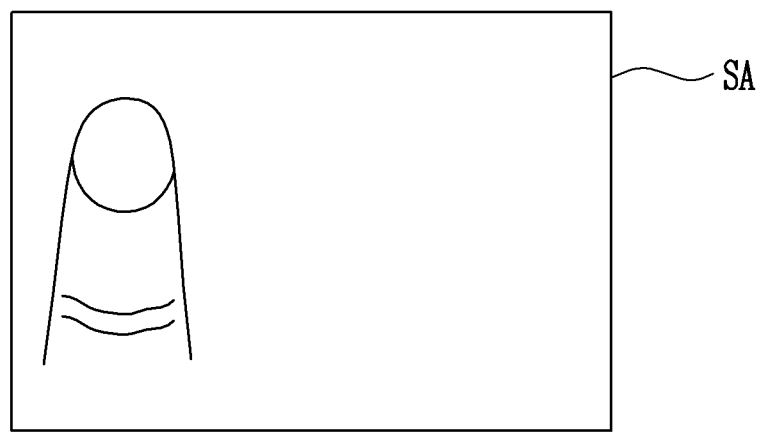
FIG. 8 is a conceptual diagram schematically illustrating a user's touch input inputted to a display device according to some embodiments.
Figure 9:
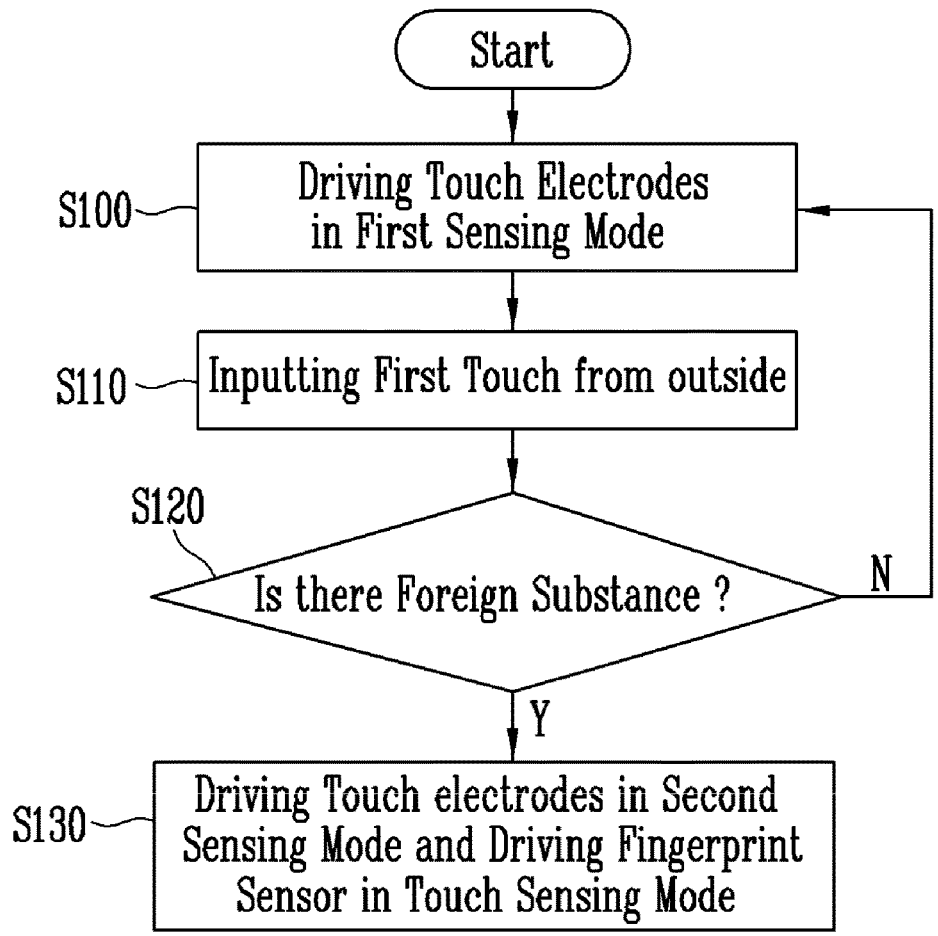
FIG. 9 is a flowchart illustrating a driving method of a display device according to some embodiments.
Figure 10:
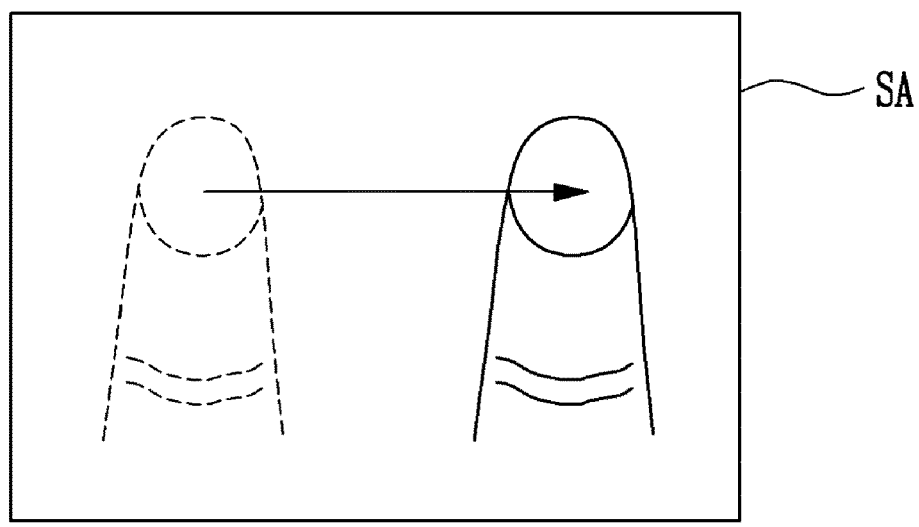
FIG. 10 is a conceptual diagram schematically illustrating a user's touch input inputted to a display device according to some embodiments.
Figure 11:
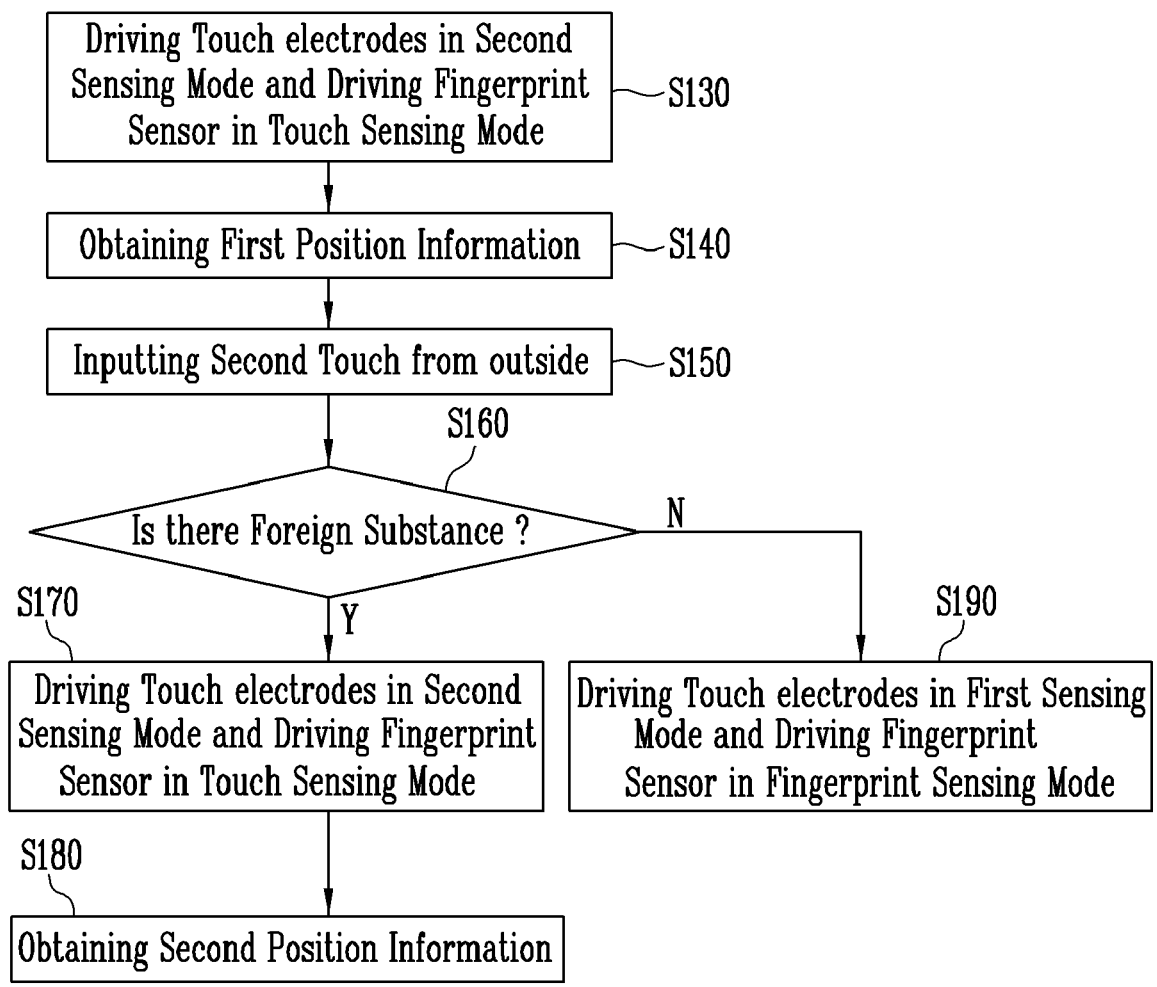
FIG. 11 is a flowchart illustrating a driving method of a display device according to some embodiments.

FIG. 8 is a conceptual diagram schematically illustrating a user's touch input inputted to a display device according to some embodiments, FIG. 9 is a flowchart illustrating a driving method of a display device according to some embodiments, FIG. 10 is a conceptual diagram schematically illustrating a user's touch input inputted to a display device according to some embodiments, and FIG. 11 is a flowchart illustrating a driving method of a display device according to some embodiments. FIGS. 8 to 11 will be described with reference to FIGS. 1 to 7 described above.

Referring to FIGS. 8 and 9, a display device according to some embodiments may sense a user's touch input inputted to the sensing area SA.

In the display device according to some embodiments, in general, the sensor driver 120 may drive the touch electrodes TE1 and TE2 in the first sensing mode (S100).

In this case, when a first touch is input to the sensing area SA from the outside (S110), the sensor driver 120 may determine whether a foreign substance exists in the first touch inputted to the sensing area SA (S120). In the first sensing mode, when the amount of change in charge of the touch electrodes TE1 and TE2 is less than a reference amount of change, the sensor driver 120 may determine that the foreign substance exists in the first touch.

When the sensor driver 120 determines that the foreign substance exists in the first touch, the sensor driver 120 may apply a driving signal for driving the touch electrodes TE1 and TE2 in the second sensing mode, and may apply a driving signal for driving the fingerprint sensor in the touch sensing mode.

Accordingly, the touch electrodes TE1 and TE2 may be driven in the second sensing mode, and the fingerprint sensor may be driven in the touch sensing mode (S130). Accordingly, in some embodiments, as the touch electrodes and the fingerprint sensor sense the user's touch input together, touch sensitivity may be improved.

When the sensor driver 120 determines that the foreign substance does not exist in the first touch, the sensor driver 120 may apply the driving signal for driving the touch electrodes TE1 and TE2 in the first sensing mode. That is, the touch electrodes TE1 and TE2 may be continuously driven in the first sensing mode. In addition, the sensor driver 120 may apply the driving signal for driving the fingerprint sensor in the fingerprint sensing mode, so that the fingerprint sensor may be continuously driven in the fingerprint sensing mode.

Referring to FIGS. 10 and 11, a display device according to some embodiments may track a user's touch input inputted to the sensing area SA.

When the foreign substance exists in the first touch input, the touch electrodes TE1 and TE2 may be driven in the second sensing mode, and the fingerprint sensor may be continuously driven in the touch sensing mode (S130). Accordingly, first position information according to the first touch input may be obtained from the touch electrodes TE1 and TE2 and/or the fingerprint sensor (S140).

When the first touch is input to the sensing area SA where both the touch electrodes TE1 and TE2 and the fingerprint sensor are positioned, the touch electrodes TE1 and TE2 may be driven in the second sensing mode, and the fingerprint sensor may be driven in the touch sensing mode. Accordingly, the sensor driver 120 may obtain the first position information of the first touch input by signals sensed from the touch electrodes TE1 and TE2 and the fingerprint sensor. Therefore, the touch sensitivity performance can be improved.

In addition, when the first touch is input to the sensing area SA in which only the touch electrodes TE1 and TE2 are positioned, the sensor driver 120 may obtain the first position information of the first touch input by signals sensed from the touch electrodes TE1 and TE2.

In addition, when the first touch is input to the sensing area SA in which only the fingerprint sensor is positioned, the sensor driver 120 may obtain the first position information of the first touch input by a signal sensed from the fingerprint sensor.

Thereafter, when a second touch is input to the sensing area SA according to the movement of the user's hand (or finger) (S150), the sensor driver 120 may determine whether the foreign substance exists in the second touch inputted to the sensing area SA (S160). In the first sensing mode, when the amount of change in charge of the touch electrodes TE1 and TE2 is less than the reference amount of change, the sensor driver 120 may determine that the foreign substance exists in the second touch.

When the sensor driver 120 determines that the foreign substance exists in the second touch, the sensor driver 120 may apply the driving signal for driving the touch electrodes TE1 and TE2 in the second sensing mode, and may apply the driving signal for driving the fingerprint sensor in the touch sensing mode. The touch electrodes TE1 and TE2 may be driven in the second sensing mode, and the fingerprint sensor may be driven in the touch sensing mode (S170).

Accordingly, the sensor driver 120 may obtain second position information according to the second touch input from the touch electrodes TE1 and TE2 and/or the fingerprint sensor (S180).

The sensor driver 120 may track the movement of the user's hand (or finger) based on the first and second position information obtained from the touch electrodes TE1 and TE2 and the fingerprint sensor.

When the sensor driver 120 determines that the foreign substance does not exist in the second touch, the sensor driver 120 may apply the driving signal for driving the touch electrodes TE1 and TE2 in the first sensing mode. That is, the touch electrodes TE1 and TE2 may be continuously driven in the first sensing mode (S190). In addition, the sensor driver 120 may apply the driving signal for driving the fingerprint sensor in the fingerprint sensing mode, so that the fingerprint sensor may be continuously driven in the fingerprint sensing mode (S190).

According to some embodiments, when sensing the touch input, the touch electrodes and the fingerprint sensor may be used together, so that the display device having improved touch performance can be provided even for the touch input in which the foreign substance exists.

Aspects of the present disclosure are not limited to the above-described effects, and various other aspects are included within the present specification.

As described above, embodiments of the present disclosure have been disclosed through the detailed description and the drawings. However, those skilled in the art or those of ordinary skill in the art will appreciate that various modifications and changes are possible without departing from the spirit and technical scope of the present disclosure as set forth in the claims below, with functional equivalents thereof to be included therein.

Therefore, the technical protection scope of the present disclosure is not limited to the detailed description described in the specification, but should be determined by the appended claims, with functional equivalents thereof to be included therein.

What is claimed is:

1. A display device comprising:
a display panel comprising a sensing area;
touch electrodes in the sensing area;
a fingerprint sensor overlapping at least a portion of the touch electrodes; and
a sensor driver configured to drive the touch electrodes and the fingerprint sensor,
wherein the sensor driver is configured to determine to drive the touch electrodes in a first sensing mode or second sensing mode, and is configured to drive the fingerprint sensor in a fingerprint sensing mode or a touch sensing mode, depending on whether a foreign substance exists in a touch inputted to the sensing area.

2. A display device comprising:
a display panel comprising a sensing area;
touch electrodes in the sensing area;
a fingerprint sensor overlapping at least a portion of the touch electrodes; and
a sensor driver configured to drive the touch electrodes and the fingerprint sensor,
wherein the sensor driver is configured to drive the touch electrodes in a first sensing mode or a second sensing mode depending on whether a foreign substance exists in a touch inputted to the sensing area, and is configured to drive the fingerprint sensor in a fingerprint sensing mode or a touch sensing mode,
wherein, when the foreign substance exists in the touch, the sensor driver is configured to drive the touch electrodes in the second sensing mode, and to drive the fingerprint sensor in the touch sensing mode.

3. The display device of claim 2, wherein, when the foreign substance does not exist in the touch, the sensor driver is configured to drive the touch electrodes in the first sensing mode, and to drive the fingerprint sensor in the fingerprint sensing mode.

4. The display device of claim 1, wherein the first sensing mode comprises a mutual capacitance method, and
wherein the second sensing mode comprises a self-capacitance method.

5. The display device of claim 1, wherein the first sensing mode comprises a mutual capacitance method and a self-capacitance method, and wherein the touch electrodes are alternately driven in the mutual capacitance method and the self-capacitance method in the first sensing mode.

6. The display device of claim 1, wherein the first sensing mode comprises a self-capacitance method, and
wherein the touch electrodes are driven in the self-capacitance method in the first sensing mode.

7. The display device of claim 1, wherein the fingerprint sensor is configured to be driven to sense a user's fingerprint in the fingerprint sensing mode, and
wherein the fingerprint sensor is configured to be driven to sense a user's touch input in the touch sensing mode.

8. The display device of claim 1, wherein the fingerprint sensor comprises sensing electrodes, an optical sensor, or an ultrasonic sensor.

9. The display device of claim 8, wherein the fingerprint sensor comprises the sensing electrodes, and is configured to be driven in a self-capacitance method in the touch sensing mode.

10. The display device of claim 8, wherein the fingerprint sensor comprises the optical sensor, and is configured to be driven so that a time for capturing a sensor image in the touch sensing mode is shorter than a reference time.

11. The display device of claim 8, wherein the fingerprint sensor comprises the ultrasonic sensor, and is configured to be driven so that image processing is processed faster than a reference time in the touch sensing mode.

12. A driving method of a display device, the method comprising:
driving touch electrodes in a first sensing mode;
receiving an inputted first touch at a sensing area;
determining whether a foreign substance exists in the inputted first touch; and
driving the touch electrodes in a second sensing mode that is different from the first sensing mode, and driving a fingerprint sensor in a touch sensing mode to sense a user's touch input, in response to a determination that the foreign substance exists.

13. The driving method of claim 12, further comprising driving the touch electrodes in the first sensing mode when the foreign substance does not exist.

14. The driving method of claim 12, further comprising driving the fingerprint sensor in a fingerprint sensing mode to sense a user's fingerprint when the foreign substance does not exist.

15. The driving method of claim 12, wherein the first sensing mode comprises a mutual capacitance method, and
wherein the second sensing mode comprises a self-capacitance method.

16. The driving method of claim 12, wherein the first sensing mode comprises a mutual capacitance method and a self-capacitance method, the method further comprising alternately driving the touch electrodes in the mutual capacitance method and the self-capacitance method in the first sensing mode.

17. The driving method of claim 12, wherein the sensing area comprises a first sensing area in which the touch electrodes are located, and a second sensing area in which the fingerprint sensor is located, the method further comprising driving the touch electrodes in the second sensing mode when the inputted first touch is inputted to the first sensing area.

18. The driving method of claim 17, further comprising driving the fingerprint sensor in the touch sensing mode when the inputted first touch is inputted to the second sensing area.

19. The driving method of claim 12, further comprising:
driving the touch electrodes in the second sensing mode and driving the fingerprint sensor in the touch sensing mode to obtain first position information of the inputted first touch;
receiving an inputted second touch at the sensing area;
determining whether the foreign substance exists in the inputted second touch;
driving the touch electrodes in the second sensing mode, and driving the fingerprint sensor in the touch sensing mode, when the foreign substance exists; and
driving the touch electrodes in the second sensing mode and driving the fingerprint sensor in the touch sensing mode to obtain second position information of the inputted second touch.

20. The driving method of claim 19, further comprising driving the touch electrodes in the first sensing mode when the foreign substance does not exist; and
driving the fingerprint sensor in a fingerprint sensing mode to sense a user's fingerprint.

* * * * *